United States Patent [19]

Tada et al.

[11] Patent Number: 5,105,177
[45] Date of Patent: Apr. 14, 1992

[54] SUPERCONDUCTING MAGNET APPARATUS, COOLING SYSTEM THEREFOR, AND ELECTROMAGNETIC LEVITATION TRAVELING EQUIPMENT INCORPORATING THE SAME

[75] Inventors: Naofumi Tada; Fumio Iida; Teruhiro Takizawa; Kazuo Kuroishi, all of Hitachi, Japan

[73] Assignees: Hitachi, Ltd., Tokyo; Hitachi Engineereings and Services Co I, Ltd., Ibaraki, both of Japan

[21] Appl. No.: 444,931

[22] Filed: Dec. 4, 1989

[30] Foreign Application Priority Data

Dec. 16, 1988 [JP] Japan .............................. 63-316414

[51] Int. Cl.$^5$ .............................................. H01F 1/00
[52] U.S. Cl. ...................................... 335/216; 361/19; 335/300
[58] Field of Search ................ 335/216, 296, 300; 104/283, 285; 505/902, 903, 904, 879; 62/51.1; 361/19

[56] References Cited

U.S. PATENT DOCUMENTS 4,237,507  12/1980  Meierovich .......................... 335/216

FOREIGN PATENT DOCUMENTS 62-173907  7/1987  Japan .................................. 104/283

Primary Examiner—Leo P. Picard
Assistant Examiner—Trinidad Korka
Attorney, Agent, or Firm—Antonelli, Terry, Stout & Kraus

[57] ABSTRACT

In a superconducting magnet apparatus including one winding of coiled superconductor wire, another winding of coiled superconductor wire, a cooling device for supplying coolant to cooling vessels which contain the respective windings therein and a non-magnetic partition wall interposed between the cooling vessels containing the respective windings to airtightly separate them, with these windings being located at relative positions enabling mutual inductance therebetween, even if quenching occurs in the superconducting magnet apparatus. It is designed to not lose the magnetic repulsive force such that equipment traveling at high speed can be safely transferred at least to the nearest station. In addition, electromagnetic levitation traveling equipment on which the above-described apparatus is installed and a control method therefore is also described.

9 Claims, 7 Drawing Sheets

SUPERCONDUCTING MAGNET APPARATUS, COOLING SYSTEM THEREFOR, AND ELECTROMAGNETIC LEVITATION TRAVELING EQUIPMENT INCORPORATING THE SAME

BACKGROUND OF THE INVENTION

1. Field of the Invention

The present invention relates to a superconducting magnet apparatus used for an electromagnetic-levitation traveling equipment and to such an electromagnetic-levitation traveling equipment provided with the superconducting magnet apparatus.

Moreover, the present invention also relates to a structure of a partition wall between windings and to a cooling system for cooling these windings, which are both necessary for practical use of this superconducting magnet apparatus.

2. Related Arts

Progress has been made in achieving practical use of an electromagnetic-levitation traveling equipment arranged in such a manner that a superconductor is used to form windings, and that a superconducting magnet apparatus where these windings are received in cooling vessels is installed on, vehicle, so that the windings receive magnetic repulsive or inductive force with respect to stator coils laid on the ground, in order to cause the vehicle to travel on a track at high speed.

Since the electromagnetic-levitation traveling equipment of this kind is required to have a light weight and to produce a strong magnetic field by means of an electric current, the magnet apparatus employing a superconductor which has no power loss has been investigated as an effective means for meeting these requirements. A superconductor may be suddenly changed from a superconducting state to a normal conductive state by a disturbance such as temperature, vibration, heat or the like (commonly known as a "quenching phenomenon", but hereinafter simply referred to as "quenching").

Conventionally, various means by which the vehicle can be safely controlled even if this quenching happens have been suggested and proposed.

For example, as disclosed in Japanese Patent Unexamined Publication No. 54-132917 (A), a method has been suggested in which when one of the superconducting magnet apparatus is provided on the vehicle is quenched the quenching is detected and the balance of the vehicle is maintained by forcedly deenergizing another superconducting magnet apparatus located in symmetry with the quenched magnet apparatus in question in order to stop the vehicle safely.

Further, as disclosed in Japanese Patent Unexamined Publication No. 57-21601(A), a method has been suggested in which sliding surfaces of emergency skids for sliding/supporting the traveling equipment structurally have configurations corresponding to configurations of armature rails so that the traveling equipment is stably set or landed on the armature rails and is safety supported even if levitation force from the electromagnet disappears.

According to these conventional methods or countermeasures to protect against quenching in the superconducting magnet apparatus of the electromagnetic levitation traveling equipment of this kind, problems in the balance of the traveling equipment in the running condition and in the stability of the equipment during an emergency stoppage are expected to be solved from the viewpoint of safety, but a disadvantage has not been completely eliminated wherein that when the superconducting magnet apparatus is deenergized or substantially demagnetized due to the quenching thereof, the magnet apparatus itself affects the stability of the traveling equipment. That is to say, although the equipment which travels at high speed by utilizing the magnetic repulsive force requires the light-weight superconducting magnet apparatus which constantly provides a great or strong magnetic repulsive force, the superconducting magnet apparatus which is quenched consumes the persistent current and magnetic repulsive force is lost so that the superconducting magnet apparatus affects the traveling equipment unavoidably as a load or weight on it. This weight of the superconducting magnet apparatus directly affects the balance of the vehicle during the high-speed traveling thereof. Since quenching may happen at any moment in the equipment which travels by utilizing the superconductivity, safety cannot be fully attained only by trying to maintain the balance of the vehicle during the high-speed traveling. Moreover, in case of the emergency stoppage in response to the quenching, necessity of re-energizing the quenched superconducting magnet apparatus is an obstacle to its practical use, because it takes very long to cool and excite the superconducting magnet apparatus again unless the apparatus is stopped near a station or on a traveling track system provided with a sufficient repair installation.

SUMMARY OF THE INVENTION

In order to solve these problems, the present invention provides a superconducting magnet apparatus which is designed not to lose the magnetic repulsive force even if the quenching happens so that an equipment traveling at high speed can at least reach a nearest station in safety, an electromagnetic-levitation traveling equipment on which the above-described apparatus is installed, and a control method of the equipment.

The present invention further provides a partition wall between windings of a superconductor as well as a cooling system for these windings, which are both indispensable to practical use of this superconducting magnet apparatus.

The superconducting magnet apparatus according to the present invention serves to solve the above-mentioned problems by a combination of a main superconducting winding for use in a normal condition and an auxiliary superconducting winding for use in an emergency, which are not only located at relative positions enabling mutual induction therebetween, but are also respectively received in heat-insulating cooling vessels, and are cooled by respective by cooling devices.

During use of the above combination of the normal condition and emergency superconducting windings, appropriate levels of persistent currents are flown for energizing the respective windings.

Locations of this combination of the normal condition and emergency superconducting windings are selected in consideration of an electromagnetic coupling coefficient between the windings so that not less than a certain level of mutual induction can be effected between the respective windings.

Moreover, the main superconducting winding used in the normal condition and the auxiliary superconducting winding used in the emergency are made of coils of different materials, which are selected for the combinational use, taking respective characteristics of the normal condition and emergency windings into account.

Also, the main superconducting winding used in the normal condition and the auxiliary superconducting winding used in the emergency are located adjacent to each other with a non-magnetic and heat-insulating partition wall interposed therebetween.

Furthermore, when the superconducting magnet apparatus of the above-mentioned structure is installed on the traveling equipment, a suitable location on a vehicle of the traveling equipment is selected.

Then, the superconducting magnet apparatus installed on the traveling equipment is so arranged that the auxiliary superconducting winding used in the emergency is closer to associated stator coils laid on an associated track on which the equipment travels than the main superconducting winding used in the normal condition is.

In the superconducting magnet apparatus of the above-described structure, a suitable time constant for attenuation or decay of a current attenuating as a result of quenching is preliminarily determined. Consequently, when the main superconducting winding for use in the steady state is quenched, a certain level of voltage is induced in the auxiliary superconducting winding for use in the emergency which is located at a relative position enabling mutual induction with the main winding, and then, a certain level of current corresponding to the voltage is generated in the auxiliary superconducting winding so that an overall magnitude of the magnetic field or force produced from the superconducting magnet apparatus can be kept substantially constant. Thus, in case of the electromagnetic levitation traveling equipment including the superconducting magnet apparatus of this kind, even if quenching happens in one of the main superconducting windings for use in the normal condition during the high-speed traveling, an electric current is immediately induced in the corresponding auxiliary superconducting winding for use in the emergency to provide a certain level of magnetic field or force required for maintaining the levitation traveling, and accordingly, the traveling equipment can continue the high-speed traveling without losing balance until it reaches a nearest station or repair installation.

Because each superconducting magnet apparatus of the present invention has a combination of two superconducting windings or more, its weight tends to be large as compared with those of the conventional methods. However, the respective superconducting windings are so designed that the total weight is not merely doubled. This matter will be explained in detail in the preferred embodiments.

In addition, the superconducting magnet apparatus of the present invention solves such the problem wherein the traveling equipment must repeat a procedure of stoppage, re-excitation or re-energizing, and restart of the traveling whenever quenching happens, so that the present invention can be remarkably effective for realizing a linear motor car.

In the superconducting magnet apparatus according to the present invention, even if quenching is caused in one of the superconducting windings provided on the apparatus, the magnetic force or field of this superconducting magnet apparatus does not completely disappear, and when such an apparatus is installed on an electromagnetic levitation traveling equipment, it has significant effects to maintain stable traveling of this traveling equipment.

By means of the partition wall used for the above-mentioned superconducting magnet apparatus in the present invention, heat generated in one quenched superconducting winding is insulated from the other superconducting winding located at the relative position enabling mutual induction with the quenched winding, so that the superconducting magnet apparatus above can be further simplified in structure.

The cooling system of the above superconducting magnet apparatus in the present invention is essential to the practical use of the apparatus.

Since the electromagnetic levitation traveling equipment in the present invention is provided with the above-mentioned superconducting magnet apparatus, even if quenching occurs, this traveling equipment can continue to travel stably without taking additional steps of emergency stoppage and the like.

In the control method for the electromagnetic levitation traveling equipment according to the present invention, arrangement for repair of the quenched superconducting magnet apparatus can be prepared in advance.

BRIEF DESCRIPTION OF THE DRAWINGS

The above and other objects, features, and advantages of the present invention will be made clearer from the description of the preferred embodiments with reference to the drawings, in which.

DETAILED DESCRIPTION OF THE PREFERRED EMBODIMENTS

The present invention will be hereinafter explained with reference to the attached drawings.

Figure 1:
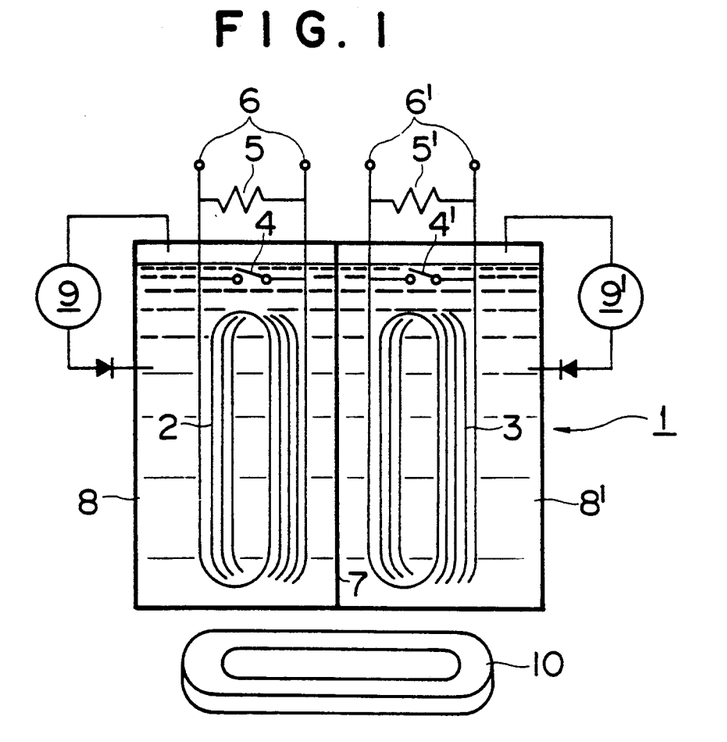
FIG. 1 is a schematic diagram for illustrating the principle of a superconducting magnet apparatus of the present invention.
Figure 2:
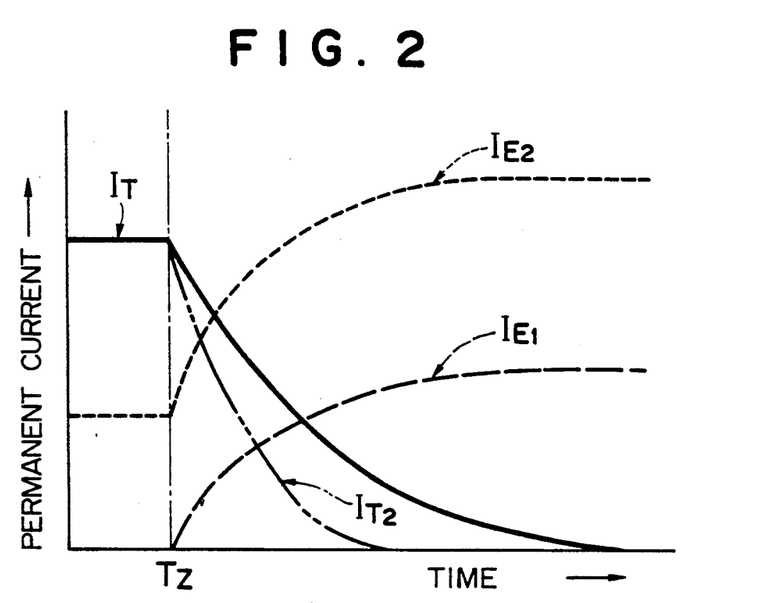
FIG. 2 is a graph for explaining persistent current modes of a main winding and an auxiliary winding provided in the superconducting magnet apparatus of the present invention.

FIGS. 1 and 2 are intended for describing the principle of a superconducting magnet apparatus according to the present invention.

The superconducting magnet apparatus 1 of the present invention includes a main superconducting winding 2 (simply referred to as the "main winding" below) used in a normal operating condition and an auxiliary superconducting winding 3 (simply referred to as the "auxiliary winding" below) to be operated in combination with the main winding 2 during an emergency. The main winding 2 and the auxiliary winding 3 are respectively provided with persistent current switches 4, 4', external resistances 5, 5', and excitation current supply terminals 6, 6'. The main winding 2 and the auxiliary winding 3 are arranged to be capable of being mutually induced through a partition wall 7 interposed therebetween which is of a material not only heat-insulating but also having a non-magnetic property while these windings are respectively received within cooling vessels 8, 8' which are independently supplied with coolant. Reference numerals 9, 9' denote cooling devices for circulating the coolant to and from the cooling vessels 8, 8'.

Reference numeral 10 denotes a stator coil which is laid on tracks or rails for an electromagnetic levitation traveling equipment when the superconducting magnet apparatus 1 of the present invention is installed for use on such an electromagnetic levitation traveling equipment.

The principle of the superconducting magnet apparatus according to the present invention will be hereinafter explained with reference to an embodiment of the apparatus installed on the electromagnetic levitation traveling equipment.

By means of coolant of liquid helium or the like supplied from the cooling device 9, the main winding 2 is cooled down to or below a critical temperature for superconductivity. Excitation current of a predetermined level from an external power source provided separately is supplied to the main winding 2 in the superconducting state through the excitation current supply terminals 6. When the excitation current of the main winding 2 reaches a certain level, the persistent current switch 4 is turned on, so that the main winding 2 in a superconducting state is maintained at a certain electromagnetic potential. If kinetic energy is imparted to the main winding 2, i.e. the main winding 2 is moved relative to the stator coil 10 in a direction across magnetic flux from the stator coil 10, electromagnetic induction is effected such that a current is flown in the main winding 2 forming a closed circuit in cooperation with the closed persistent current switch 4, thereby producing a magnetic flux derived from the equation:

$$\Phi = NI \text{ (N is the number of turns of the winding).}$$

This magnetic flux causes magnetic repulsion of the main winding 2 from the stator coil 10, which serves as the repulsive force of the superconducting magnet apparatus against the stator coil 10. It is this force that serves as the levitation force of the electromagnetic leviation traveling equipment.

In the apparatus of this kind including the main winding 2 made of superconducting wire, there is a risk that quenching may take place in the superconductor at any time. Once such quenching happens, the current energy which has been maintained within the main winding 2 is rapidly consumed in the form of heat produced due to an electric resistance concerned, and the magnetic flux which has been produced by the main winding 2 disappears. In this case, however, it is generally known that a time constant or a period of time for which consumption of the current energy continues after the quenching of the main winding 2 can be adjusted principally by adjusting the magnitudes of the resistance of the quenched winding 2 and the external resistance 5, and that the current as well as the magnetic flux will decrease or decay at the time constant.

Due to this attenuation or decay of the magnetic flux in response to the current energy consumption, an electromotive force for preventing the attenuation of the magnetic flux is induced in the auxiliary winding 3 which is located at a position providing mutual inductance with the main winding 2. However, it goes without saying that for utilizing this mutual inductance, the auxiliary winding 3 is required to be arranged to have such properties and shape that it will not be affected by heat generated in response to the quenching of the main winding 2 and by the relatively rapid attenuation of the magnetic flux of the main winding 2.

When a certain value of voltage is induced in the auxiliary winding 3 according to the attenuation of the magnetic flux in response to the quenching of the main winding 2, current corresponding to that of the induced voltage is induced in the auxiliary or emergency winding 3. That is to say, as illustrated in a graph of FIG. 2, an electric current, in a persistent current mode $I_T$, of the main winding 2 continues to have a predetermined value until the quenching takes place. However, just after the occurrence of the quenching at a time $T_Z$, it begins to attenuate according to the time constant inherent in the winding. Then, in the auxiliary winding 3 which is located at the position providing mutual inductance with the main winding 2, current is induced due to the mutual inductance, as indicated by a persistent current mode $I_{E1}$ of the auxiliary winding 3 in the graph. A mode $I_{E2}$ shows a condition of the induced current changing in response to the mutual induction in a case where a certain level of excitation or energizing current is preliminarily applied to the auxiliary winding 3 in the same manner as the main winding 2 except for the difference in the levels of the persistent current therebetween. A mode $I_{T2}$ shows an attenuation characteristic when the main winding 2 has a different or altered time constant.

The locations or arrangements of the main winding 2 and the auxiliary winding 3 were suitably designed on the basis of assumed calculations by the inventors, and these windings were further arranged to be free from the respective heat influences, so that the mutual inductance of the windings was experimentally observed. In this experiment with shapes of windings, numbers of turns, and current densities being preset, coupling coefficients of the windings were derived from the observed currents in the auxiliary winding 3 when a gap between the windings was changed from 10 mm to 100 mm. The coefficient was found to be in a range of 0.6 to 0.2, thereby confirming a sufficiently strong mutual inductance.

According to these results, when the shapes or configuration of windings, the numbers of turns, and the current densities are selected appropriately, current in the auxiliary winding 3 will be suitably increased in response to attenuation of current in the main winding 2. For example, when an electric current in the persistent current mode of the main winding is 549 amperes, and a current in the same mode of the auxiliary winding is 200 amperes, with the time constant of the main winding being four seconds, and when quenching is forcedly caused in the main winding 2, the persistent current induced in the auxiliary winding 3 in response to the current attenuation of the main winding 2 will be increased from 200 amperes to 520 amperes to 300 amperes, while taking the gap between the windings and stray loss into account.

It was found on the basis of the above calculation results that when self-inductances of the main winding and the auxiliary winding are respectively expressed by $L_1$, $L_2$, if a mutual inductance of these windings is adjusted to be $0.2 \sqrt{L_1 L_2}$ or more, a sufficient coupling coefficient can be provided.

Figure 3:
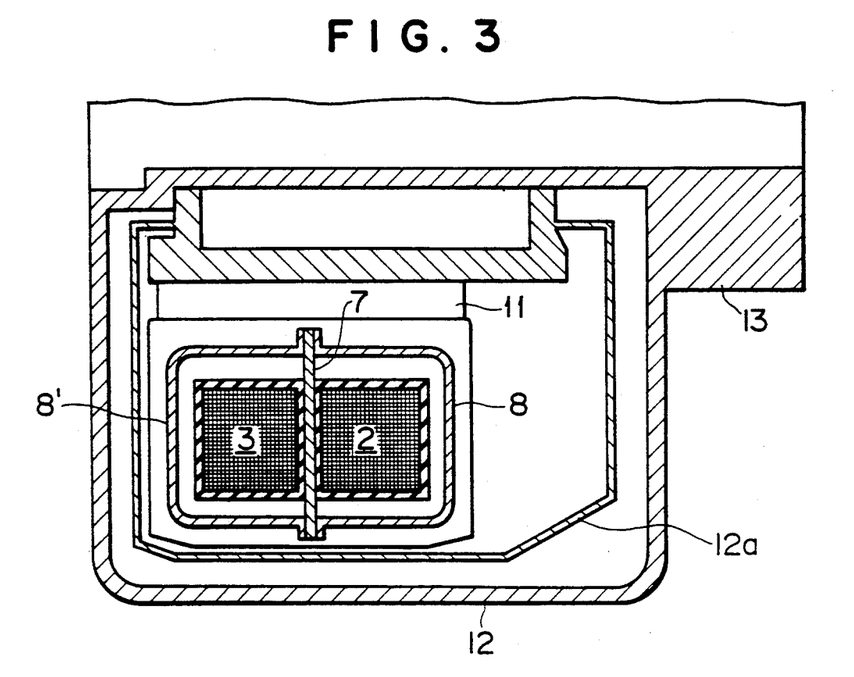
FIG. 3 is a cross-sectional view showing a structure of the superconducting magnet apparatus according to a preferred embodiment of the present invention.

The superconducting magnet apparatus including the combination of the main winding 2 and the auxiliary winding 3 described above can for example be constructed as illustrated in FIG. 3.

FIG. 3 is a sectional view showing only a portion of the apparatus in which these windings are located, and in this drawing, the same reference numerals as used in the drawings previously described denote the equivalents of those drawings.

The main winding 2 and the auxiliary winding 3 are located to have the partition wall 7 interposed therebetween. These windings are securely fixed on the partition wall 7 and independently received within the cooling vessels 8, 8', where the respective windings are separately kept airtight by means of the partition wall 7. The structure of this partition wall 7 will be explained later. Reference numeral 11 denotes a support beam for mechanically supporting the partition wall 7 and the cooling vessels 8, 8'. As a matter of course, this support beam 11 serves to mechanically support the windings against the magnetic field thereat so as to cause the superconducting magnet apparatus or even the electromagnetic levitation traveling equipment to function as a whole. Reference numeral 12 denotes a vacuum container which constitutes an outer frame of a portion for the windings in the superconducting magnet apparatus. Reference numeral 13 denotes a mounting portion formed at a part of the vacuum container 12.

The superconducting magnet apparatus 1 of this structure is further provided with piping for supplying-/recovering the coolant into/from the cooling vessels 8, 8', wiring for supplying the excitation or energizing current(s) to the main winding 2 and the auxiliary winding 3, and the like, but they are omitted from the drawing for simplicity. In the superconducting magnet apparatus of the above-described structure, when quenching happens in the main winding 2, sufficient mutual induction can be produced between this main winding and the adjacent auxiliary winding 3 through the interposed non-magnetic partition wall 7 which does not affect the mutual inductance. Further, as explained before, this superconducting magnet apparatus requires such conditions that the heat generated in response to the quenching of the main winding 2 is isolated from the auxiliary winding 3, and that these windings are located at positions enabling the mutual inductance. Reference numeral 12a is a radiation shield.

Figure 4:
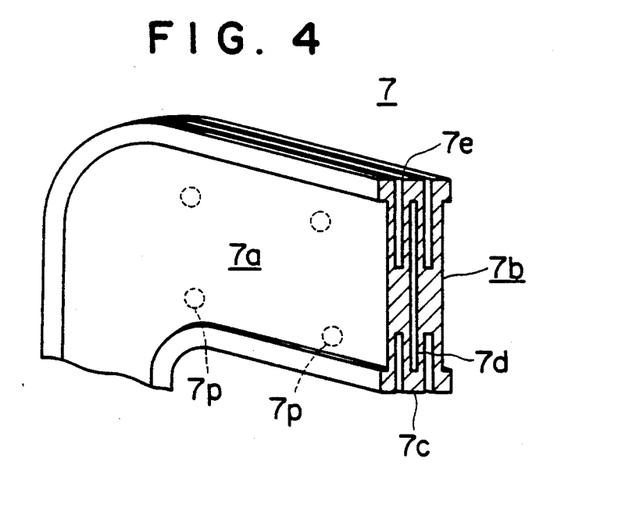
FIG. 4 is a sectional perspective view of a section of a partition wall, used in the above superconducting magnet apparatus, according to an embodiment of the present invention.

FIG. 4 shows one embodiment of the partition wall 7 provided between the main winding 2 and the auxiliary winding 3. As mentioned before, this partition wall 7 is required to be non-magnetic and heat-insulating.

To meet such requirements, the partition wall 7 comprises surface portions 7a, 7b to be faced to windings 2, 3 and connecting support beams 7c integrally staggered between these surfaces portions 7a, 7b. A hollow portion 7d is formed between such integrally superposed connecting beams 7c. An appropriate number of openings 7p are formed in the beams 7c to allow the hollow portion 7d to be exposed to the same environmental condition, i.e. a vacuum condition, to which edge portions 7e of the partition wall 7 are exposed, thereby enhancing the heat insulation effect.

The partition wall of this kind may be produced from component plates made from fiber-reinforced resin material or the like, where each plate has a standard configuration and is formed by molding. In this case, a required number of such partition plates of the standard configuration are integrally superposed, taking calculated results from the design planning into consideration.

Figure 5:
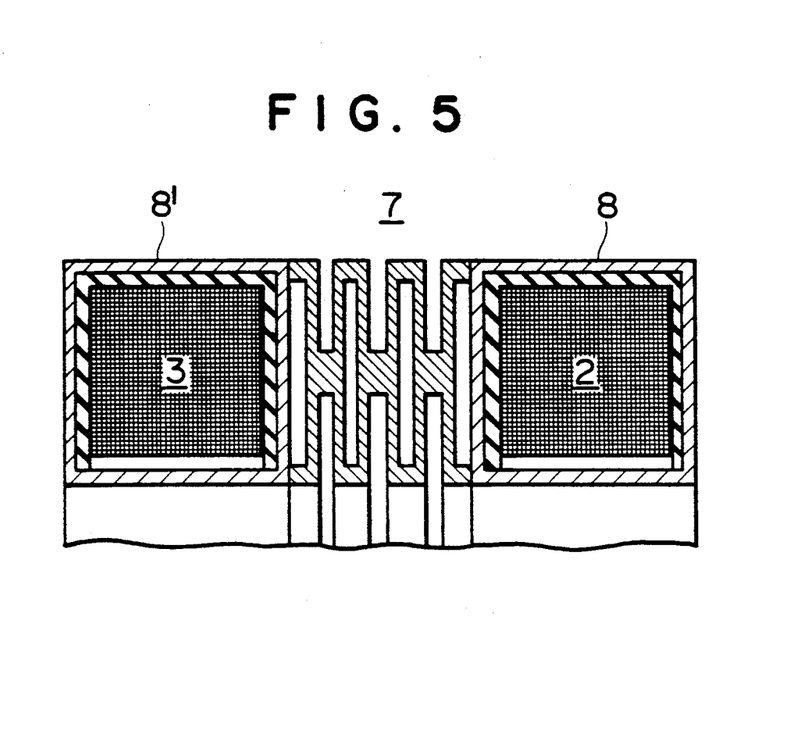
FIG. 5 is a sectional view showing a detail of the structure of the partition wall in FIG. 4.

FIG. 5 is a sectional view showing the partition wall of FIG. 4 located between the main winding 2 and the auxiliary winding 3, in which the reference numerals are the same as have been used in the above drawings. In this drawing, however, the partition wall 7 has six partition plates or preformed members of the standard configuration superposed integrally.

Figure 6:
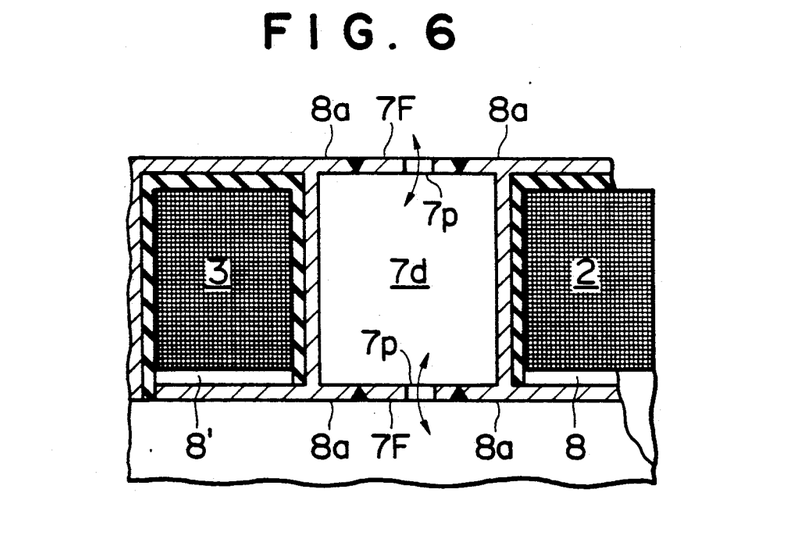
FIG. 6 is a sectional view showing another embodiment of the partition wall.

FIG. 6 illustrates another embodiment of the partition wall 7, which is integrally formed with the cooling vessels 8, 8' for containing the main winding 2 and the auxiliary winding 3.

More particularly, end portions of the cooling vessels 8, 8' are protrudingly extended to form wall-connecting sections 8a, to which wall-elongating members 7F are integrally welded to form the hollow portion 7d for heat insulation. This hollow portion 7d communicates with the outside through openings 7p formed in the wall elongating members 7F so as to be maintained at a vacuum.

The partition wall as well as the cooling vessels of this structure are made from a material such as stainless steel, which is non-magnetic and weldable.

In addition to the above explanation of the partition wall 7 with reference to the embodiments, it should be further noted that it makes a great difference in the mechanical strength required for the partition wall 7 whether or not the partition wall 7 should serve to transmit the magnetic forces which are produced from the main winding 2 and the auxiliary winding 3 located on both sides of the partition wall 7 through the support beam 11 to the mounting portion 13. Moreover, the structure of the partition wall 7 depends on a value of the gap between the main winding 2 and the auxiliary winding 3 required to satisfy the magnetic coupling coefficient of these windings which is determined by the design.

Taking such matters into account, the embodiment of FIG. 5 can be used when the partition wall 7 has no or little load thereon, while the embodiment of FIG. 6 has a structure which is capable of withstanding the load.

Figure 7:
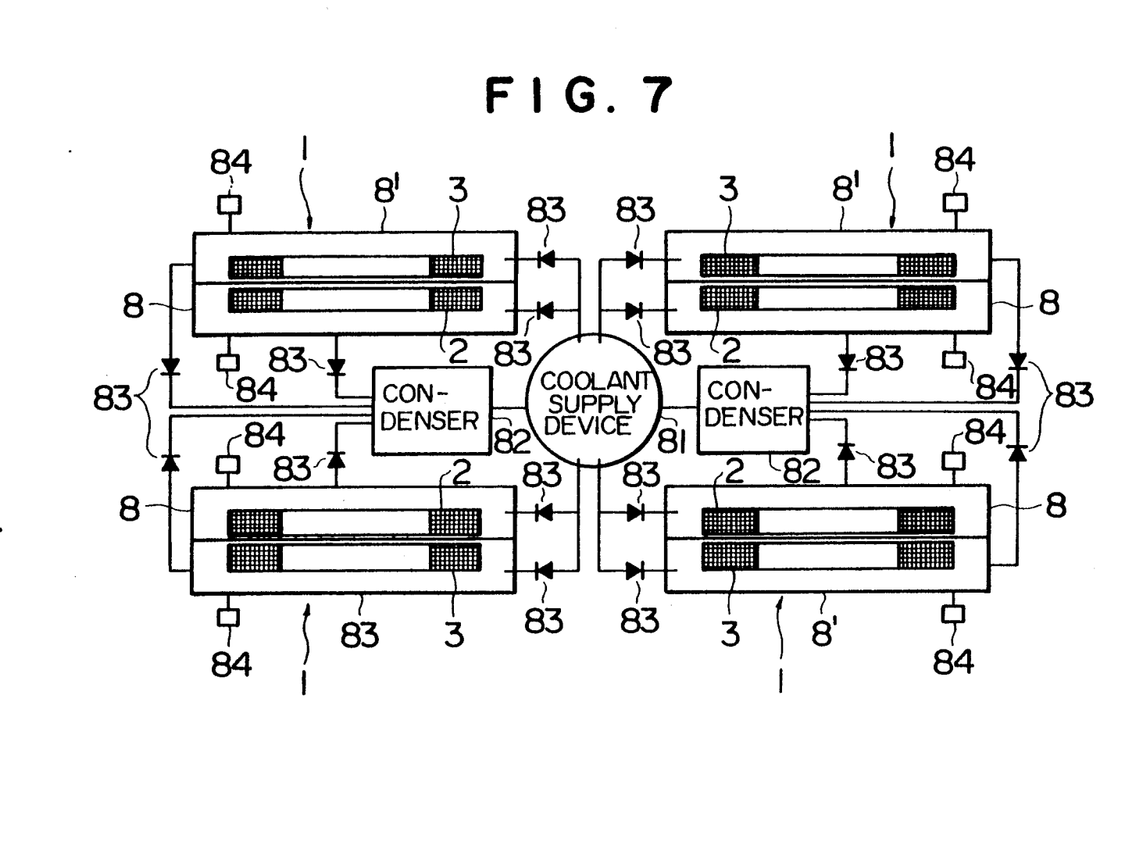
FIG. 7 is a schematic diagram showing a structure of a cooling system according to an embodiment of the present invention which is essential to the above-mentioned superconducting magnet apparatus.

FIG. 7 is a schematic diagram for explaining a cooling system of the superconducting magnet apparatus described so far.

In this drawing, reference numeral 81 denotes a coolant supply device, 82 condensers, 83 check valves, and 84 safety valves. The same reference numerals as have been used in the above drawings denote the equivalents of those drawings.

This drawing illustrates an embodiment with one central coolant supply device 81 serving to simultaneously cool four superconducting magnet apparatuses 1, each including the main winding 2 and the auxiliary winding 3 independently received in the respective cooling vessels 8, 8'.

From the coolant supply device 81, liquid helium or the like is supplied through respective pipe lines via the check valves 83 to each of the cooling vessels 8, 8' of the superconducting magnet apparatuses 1. Since this liquid helium is supplied under a substantially normal pressure, it evaporates in the cooling vessels, and the evaporated vapor is collected in the condensers 82 through additional intake pipe lines, in which condensers 82 the evaporated vapor is again liquified and returned back to the coolant supply device 81. By repeating this cycle, the main windings 2 and the auxiliary windings 3 are maintained at a temperature equal to or below the critical temperature for superconductivity.

Then, if quenching suddenly happens in any of the main windings 2, a considerable amount of heat is generated.

Accordingly, the amount of the coolant which evaporates due to the heat is increased. In this case, it is almost impossible for the condensers 82 to collect all of the increased evaporated vapor. For this reason, the cooling vessels containing the respective windings are independently provided with the safety valves 84 serving as surge absorber means for safely avoiding a rapid and excessive pressure increase owing to the increased evaporation of the coolant in response to the quenching. Moreover, an important feature of this cooling system is that independent pipe lines are provided for avoiding the influence of the heat generated in one of the main windings 2 which has been quenched and particularly for preventing the coolant evaporated due to such heat from flowing into different passages for cooling the other windings in the superconducting state. The independent pipe lines are provided in combination with a coolant supply device 81 which has the required capacity. Since the independent pipe lines are respectively provided with check valves 83, counterflow of the coolant therein can be prevented.

If necessary, shut-off valves such as solenoid valves may be further placed in juxtaposition with the respective check valves to stop the coolant supply, in cooperation with additional means for detecting quenching in any of the windings, to the cooling vessel which contains the quenched winding (and also to stop the evaporated vapor flow to the corresponding condenser).

According to the superconducting magnet apparatus of the present invention, as has been explained above, even if quenching happens in the superconductor wire of one winding, the other winding located at a position enabling mutual inductance with the quenched winding at least maintains the magnetic energy or force. This magnetic force can be made strong enough as result of the mutual inductance, to maintain the levitation force, which is something the conventional electromagnetic levitation traveling equipment has not been able to achieve.

A new type of the electromagnetic levitation traveling equipment on which the superconducting magnet apparatus of the present invention is installed, will be hereinafter described.

Figure 8:
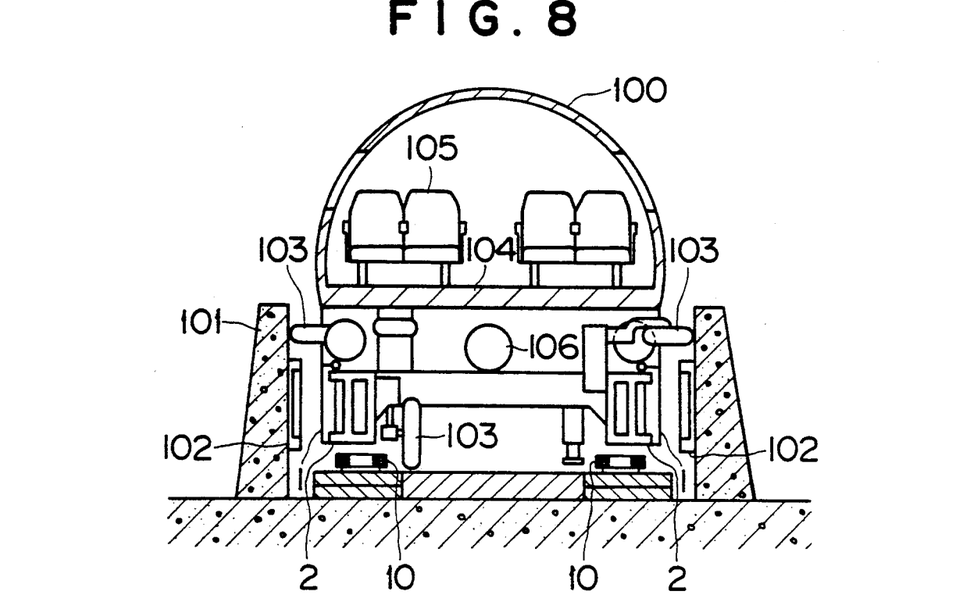
FIG. 8 is a front sectional view showing an electromagnetic levitation traveling equipment according to an embodiment of the present invention on which a plurality of the above-mentioned superconducting magnet apparatuses are installed.

FIG. 8 is a cross-sectional view showing the electromagnetic levitation traveling equipment as viewed from the front.

The general structure of this electromagnetic levitation traveling equipment is not different from the conventional ones. However, the superconducting magnet apparatus required for levitation traveling comprises main windings and auxiliary windings according to the present invention.

In the drawing, reference numeral 100 denotes a vehicle's body positioned within tracks or rails 101 on the ground to travel by utilizing the electromagnetic induction and the magnetic repulsive force produced between the superconducting magnet apparatus 1 set on the vehicle body 100 and the stator coils 10 and propulsive stator coils 102. Reference numerals 103 denote wheels, 104 a floor of the vehicle body 100, and 105 seats. Auxiliary instruments 106 such as the coolant supply device 81, pipe lines, and detecting means are installed under the floor 104.

Figure 9:
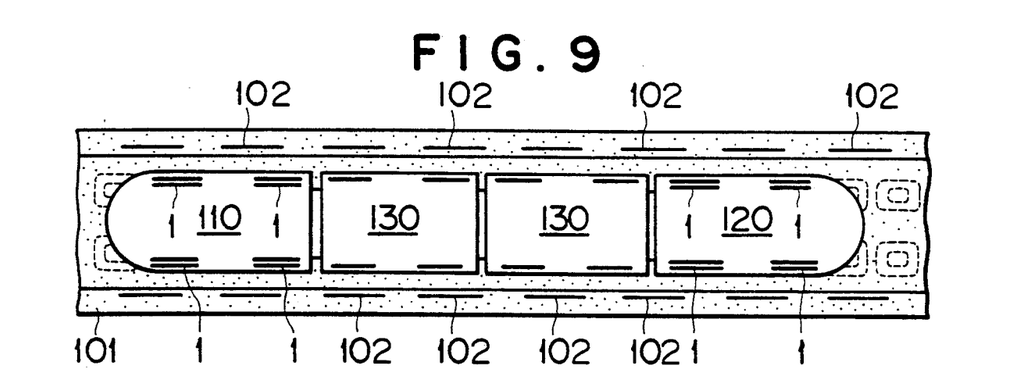
FIG. 9 is a plan view of the equipment in FIG. 8.

As illustrated in FIG. 9, the electromagnetic levitation traveling equipment of this type is generally arranged to have several vehicles interconnected. This drawing shows one embodiment comprising a leading or head vehicle 110, a trailing vehicle 120, and two intermediate vehicles 130 interconnected therebetween.

Further, the electromagnetic levitation traveling equipment includes the above-described superconducting magnet apparatuses 1 each provided on the leading vehicle 110 and the trailing vehicle 120.

In a case of the electromagnetic levitation traveling equipment, acceleration in a traveling direction and centrifugal force generated in traveling at a curve are the main forces exerted on the vehicle bodies during traveling. Both of these forces are designed to be balanced by the magnetic repulsive force between the superconducting magnet apparatuses 1 set at appropriate locations on the vehicles and the stator coils 10 laid on the track. Thus, if one of these superconducting magnet apparatuses 1 loses the magnetic repulsive force due to quenching, the corresponding portion of the vehicle will no longer be supported by this force, and consequently the vehicle will lose the balance as a whole.

Among a plurality of the interconnected vehicles, the leading or trailing vehicle 110 or 120 is most drastically affected by such unbalance of the forces. This is because the intermediate vehicles 130 have both ends connected to other vehicles 110, 120 or 130 so that loss of the levitation force of any one of the intermediate vehicles 130 owing to the above-mentioned quenching can be compensated by distributing the influence of the loss through the connecting means to the other vehicles, if the connecting means are suitably selected.

On the other hand, when quenching happens in one of the superconducting magnet apparatuses 1 of the leading vehicle 110, there is a risk that the unbalance of the forces in response to the quenching will directly result in upsetting the steering balance of the leading vehicle 110.

For this reason, according to the present invention, the superconducting magnet apparatus 1 explained before is provided on each of the leading vehicle 110 and the trailing vehicle 120 to avoid the above-mentioned risk most effectively.

FIG. 9 shows the embodiment in which four superconducting magnet apparatuses 1 are installed on each of the leading vehicle 110 and the trailing vehicle 120.

Figure 10:
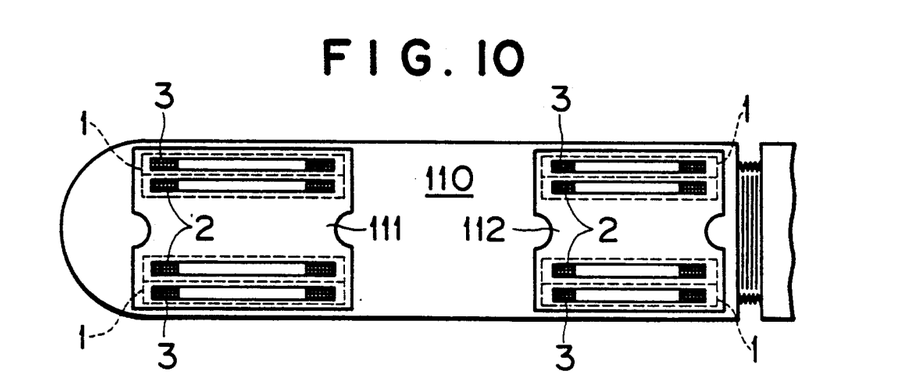
FIG. 10 is a plan view showing only a lead or head vehicle of the equipment in FIG. 8.

FIG. 10 is an enlarged view showing the leading vehicle 110 of FIG. 9, which is provided with two carriages 111, 112, with two superconducting magnet apparatuses 1 being provided on each carriage.

Further, in each of the superconducting magnet apparatuses 1 installed on the vehicles in this manner, the arrangement or locations of the superconducting windings are appropriately selected. That is to say, the main winding 2 and the auxiliary winding 3 described before are located in such a manner that the auxiliary winding 3 is closer to the associated propulsive stator coil on the track than the main winding 2. The reason for these locations is that in the superconducting magnet apparatus where those windings are lcoated at positions enabling the persistent current in the auxiliary winding to be increased due to the mutual induction, it is impossible for this increase in the magnetic energy in the auxiliary winding to perfectly compensate for the decrease in the magnetic energy in the main winding 2 due to the extinction of the persistent current due to the quenching.

Figure 11:
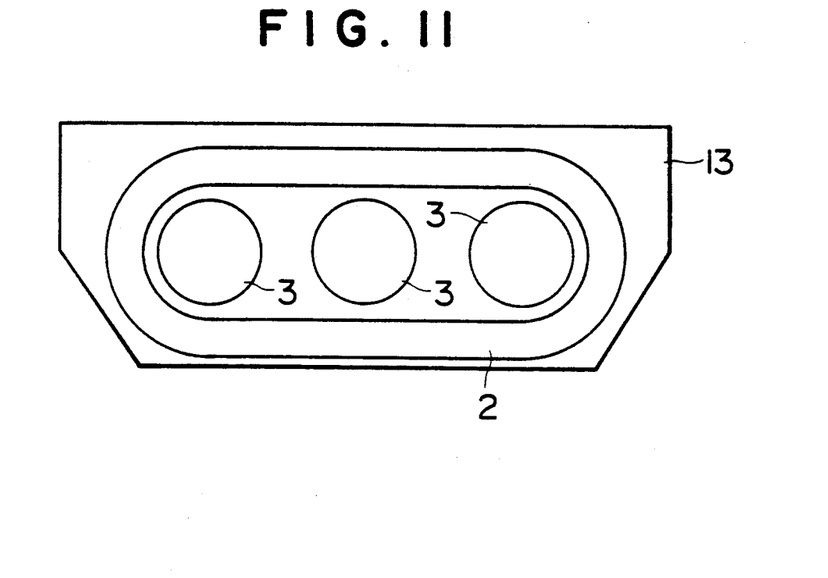
FIG. 11 is a view showing an appearance of another embodiment of the superconducting magnet apparatus according to the present invention which is installed on the electromagnetic levitation traveling equipment.
Figure 12:
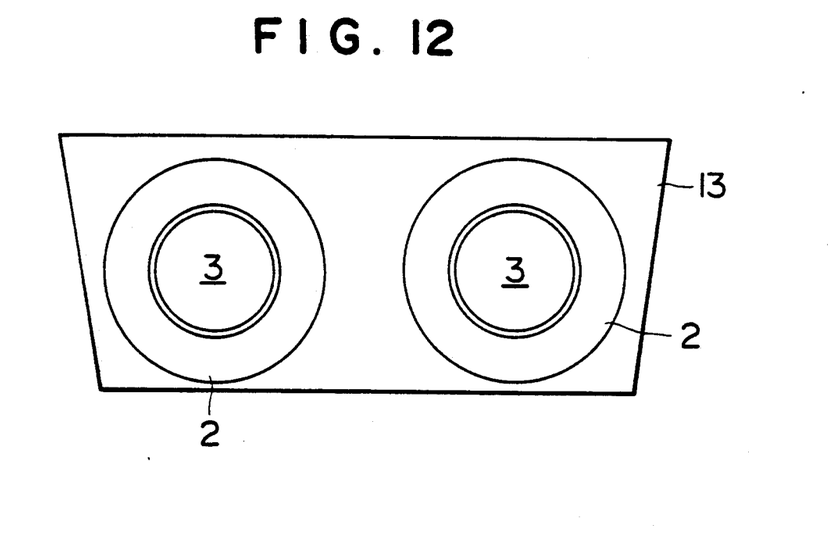
FIG. 12 is a view showing an appearance of still another embodiment of the same.

FIGS. 11 and 12 illustrate modifications of the superconducting magnet apparatus explained before which have been improved with respect to installation on the electromagnetic levitation traveling equipment.

The embodiment of FIG. 11 has such a structure that the main winding 2 in a race-track form is located at the mounting portion 13 so as to have a plurality of the auxiliary windings 3 (three in the drawing) contained therewithin.

Although this structure is effective when the superconducting magnet apparatus is produced to have a reduced thickness, the arrangement of the independent cooling systems is complicated.

FIG. 12 shows a modification of the above-mentioned embodiment, which has such a structure that plural sets of the main winding 2 and the auxiliary winding 3 located concentrically are provided at the mounting portion 13.

Figure 13:
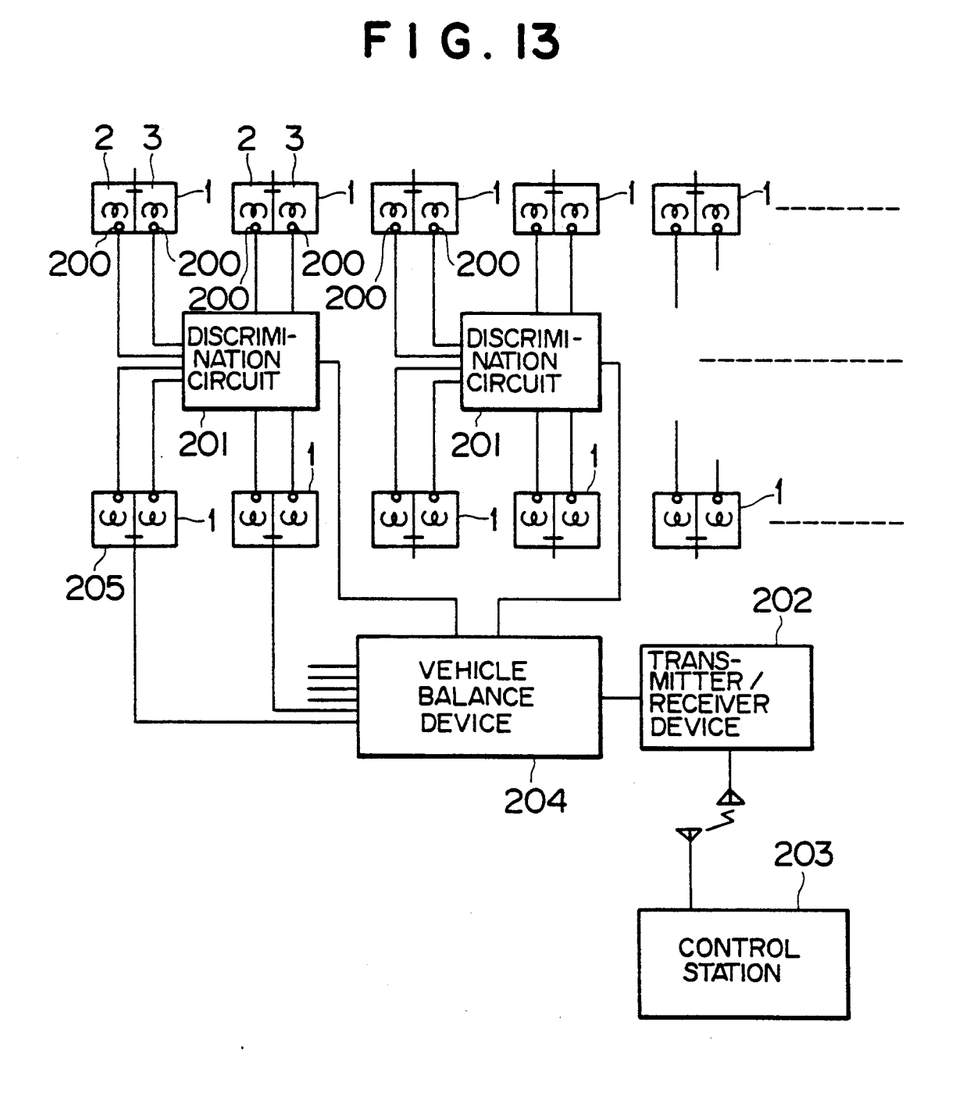
FIG. 13 is a circuit diagram for explaining a control method according to an embodiment of the present invention which is intended for use in the above-mentioned electromagnetic levitation traveling equipment.

FIG. 13 is a circuit diagram for explaining a security method required for the electromagnetic levitation traveling equipment on which the superconducting magnet apparatuses described before are installed.

According to the above-described superconducting magnet apparatus, even if quenching happens in the main or auxiliary winding, the apparatus can avoid the worst situation that the magnetic levitation force disappears due to the quenching. Consequently, the electromagnetic levitation traveling equipment is able to continue traveling on the track. However, while the traveling is continued with the quenched superconducting winding remaining as it is, if quenching happens in the other winding in the same superconducting magnet apparatus, the balance of the electromagnetic levitation traveling equipment as a whole is upset. For avoiding such a risk, a security or fail-safe method is required where the operation of the electromagnetic levitation traveling equipment is controlled, so as to identify the quenched superconducting magnet apparatus and to immediately determine a timing when and a place where the electromagnetic levitation traveling equipment, which continues traveling is to be stopped and repaired.

A system for carrying out the proposed security method is shown in FIG. 13, where a sensor 200 for detecting quenching is provided at each of the main winding 2 and the auxiliary winding 3 of the superconducting magnet apparatus 1. In response to an output from this sensor 200, the quenched winding is discriminated by a discrimination device 201, from which a discrimination signal is delivered to a transmitter/receiver device 202, and then is sent to a control station 203 where the signal is indicated on a display. In addition, an output from the discrimination device 201 is transmitted to a vehicle balance device 204 which serves to balance the electromagnetic levitation traveling equipment, for example, by forcibly causing a quenching in a winding of a different superconducting magnet apparatus at a position effective to balance the quenched winding of the superconducting magnet apparatus, so as to easily maintain stability of the electromagnetic levitation traveling equipment as a whole. Reference numeral 205 denotes such a forcible quenching device.

Alternatively, in the equipment of the present invention which can continue traveling in spite of the quenching in the superconducting magnet apparatus, optional means operable in the control station such as means for controlling a traveling speed, projection-type stabilizer wings or the like can be also employed in place of a forcible quenching of the winding by the balance device 204. When the traveling equipment reaches a station or some other place provided with a repair installation, it undergoes treatment for removing the quenching condition. If preparation for this treatment is finished before arrival of the traveling equipment, safety of the electromagnetic levitation traveling equipment of this kind can be remarkably enhanced.

What is claimed is:

1. A superconducting magnet apparatus comprising:
   first and second cooling vessels having coolant disposed therein;
   a non-magnetic partition wall separating the first cooling vessel from the second cooling vessel; and
   first and second superconducting windings disposed in the coolant in the first and second cooling vessels, respectively, the first and second superconducting windings being electromagnetically coupled with each other;
   wherein, in a normal condition in which the first and second superconducting windings are maintained in a superconducting state, a rated current flows in the first superconducting winding and a current smaller than the rated current flows in the second superconducting winding; and
   wherein, in an emergency condition in which the first superconducting winding is quenched from a superconducting state to a normal state, the second superconductor winding is excited as a result of the quenching of the first superconducting winding by virtue of the electromagnetic coupling between the first and second superconducting windings such that the current smaller than the rated current which flows in the second superconducting winding in the normal condition increases in the emergency condition to a current which is substantially equivalent to the rated current which flows in the first superconducting winding in the normal condition.

2. The superconducting magnet apparatus according to claim 1, wherein the first and second superconducting windings have mutually different quenching characteristics such that the second superconducting winding is maintained in a superconducting state when the first superconducting winding is quenched from a superconducting state to a normal state.

3. The superconducting magnet apparatus according to claim 1, wherein the non-magnetic partition wall insulates the first cooling vessel from the second cooling vessel by means of a vacuum.

4. The superconducting magnet apparatus according to claim 1, further comprising a cooling device for independently supplying coolant to the first and second cooling vessels.

5. An electromagnetic levitation traveling equipment comprising a plurality of vehicles connected together, wherein at least one superconducting magnet apparatus according to any one of claims 1 to 4 is disposed on each of a leading vehicle and a trailing vehicle of the plurality of vehicles.

6. The electromagnetic levitation traveling equipment according to claim 5, wherein each said superconducting magnet apparatus is disposed on the respective vehicle relative to an associated propulsive stator coil on a track for the plurality of vehicles such that the first superconducting winding is further away from the stator coil than is the second superconducting winding.

7. The electromagnetic levitation traveling equipment according to claim 5, wherein the first cooling vessel surrounds the second cooling vessel and the first superconducting winding surrounds the second superconducting winding.

8. The superconducting magnet apparatus according to claim 1, wherein the non-magnetic partition wall provides a gastight separation between the first and second cooling vessels, and wherein a coupling coefficient of the electromagnetic coupling between the first and second superconducting windings is not less than 0.2, the coupling coefficient being defined by $M/\sqrt{L_1 \cdot L_2}$, wherein $L_1$ and $L_2$ are self-inductances of the first and second superconducting windings, respectively, and M is a mutual inductance of the first and second superconducting windings.

9. The superconducting magnet apparatus according to claim 1, further comprising a support beam for supporting the first and second cooling vessels to resist a magnetic force produced between the first and second superconducting windings, and a mounting portion integrally formed with the support beam, the mounting portion enabling the superconducting magnet apparatus to be mounted on a device for using the superconducting magnet apparatus.

* * * * *